United States Patent
Manoukian

[11] 3,875,530
[45] Apr. 1, 1975

[54] GASEOUS LASER WITH IMPROVED MEANS FOR SUPPORTING THE DISCHARGE CONFINING BORE TUBE

[75] Inventor: Nubar S. Manoukian, San Jose, Calif.

[73] Assignee: Coherent Radiation, Palo Alto, Calif.

[22] Filed: Feb. 23, 1973

[21] Appl. No.: 335,239

Related U.S. Application Data

[63] Continuation-in-part of Ser. Nos. 320,093, Jan. 2, 1973, , and Ser. No. 320,146, Jan. 2, 1973, , and Ser. No. 320,145, Jan. 2, 1973, abandoned.

[52] U.S. Cl. .......... 331/94.5 D, 248/54 R, 138/113, 313/220, 313/356
[51] Int. Cl. ............................................. H01s 3/22
[58] Field of Search ........ 248/49, 54, 358; 138/112, 138/113, 114; 331/94.5; 313/220, 356

[56] References Cited
UNITED STATES PATENTS

| | | | |
|---|---|---|---|
| 2,512,116 | 6/1950 | Siebels | 138/113 |
| 3,126,918 | 3/1964 | Eaton | 138/113 |
| 3,683,300 | 8/1972 | Hohenstein | 331/94.5 |
| 3,753,149 | 8/1973 | Kindl | 331/94.5 G |

Primary Examiner—Ronald L. Wibert
Assistant Examiner—R. J. Webster
Attorney, Agent, or Firm—Limbach, Limbach & Sutton

[57] ABSTRACT

A gaseous laser wherein the discharge confining bore tube is supported by improved means for allowing axial expansion of the bore tube while maintaining lateral or radial alignment and permitting radial expansion, of the bore tube.

6 Claims, 8 Drawing Figures

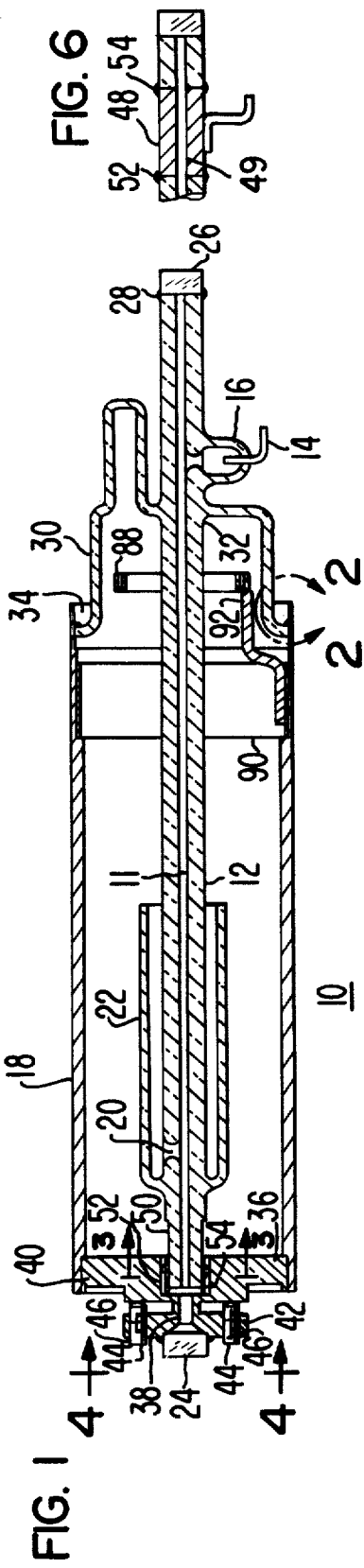
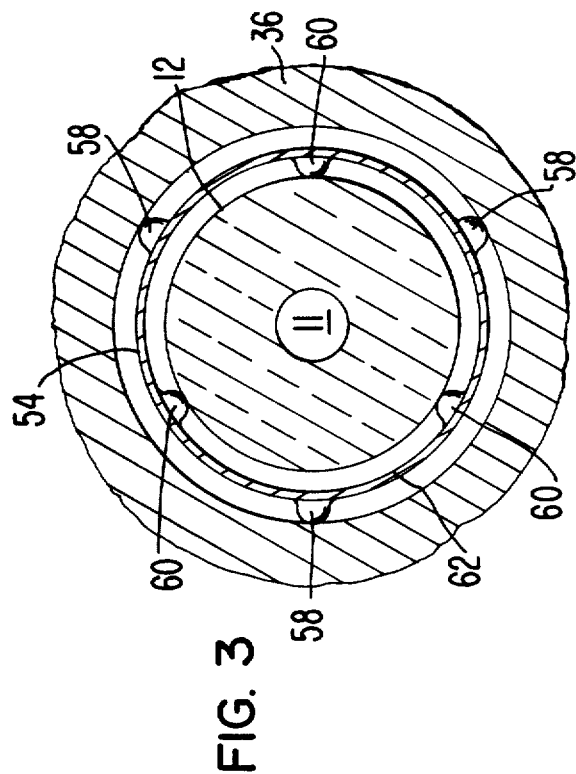

GASEOUS LASER WITH IMPROVED MEANS FOR SUPPORTING THE DISCHARGE CONFINING BORE TUBE

CROSS-REFERENCE TO RELATED APPLICATIONS

This application is a continuation-in-part application of the following copending patent applications: Ser. No. 320,093, filed Jan. 2, 1973; Ser. No. 320,146, filed Jan. 2, 1973; and Ser. No. 320,145, filed Jan. 2, 1973, now abandoned.

BACKGROUND OF THE INVENTION

The present invention relates to lasers and, in particular, to an improved gaseous laser.

Although lasers and their principle of operation constitute an entirely new and exciting area of technology, in actual practice, laser fabrication, at least in the area of gaseous laser fabrication, has largely been little more than an outgrowth of electron tube manufacturing and fabrication techniques.

A gaseous laser includes a gas discharge or plasma tube containing the gaseous lasing medium. Within this discharge tube, typically, are one or more anodes, a cathode and a discharge-confining bore tube. The purpose of the bore tube is to concentrate the electrical discharge between the anode and the cathode within a relatively small volume and thereby increase the current density through the gaseous medium.

An optical resonator is axially aligned with the discharge-confining bore tube. The resonator includes one mirror or reflector which is totally reflecting and a second mirror or reflector which is sufficiently light transmissive to allow the emergence of an output light beam from the laser.

The optical resonator can be independent and external to the discharge tube or the mirrors forming the optical resonator can be made a part of the plasma tube envelope. In the latter case, the laser is said to have an internal optical resonator.

It is important that the discharge-confining bore tube be maintained laterally or radially aligned with the optical resonator. At the same time, the high temperatures of the confined gases during operation of the laser create undesirable expansion stresses and strains in the discharge-confining bore tube and in the laser if provision is not taken to allow for them.

Prior art lasers have utilized a number of designs to support the discharge-confining bore tube. In one laser, the bore tube is rigidly attached at its opposite ends with the vacuum-confining discharge tube envelope. This has proven to be unsatisfactory in many instances because thermally induced stresses have caused fracturing of the bore tube and/or discharge tube, particularly at the joint between the vacuum envelope and the bore tube.

Another common approach is to support one end of the bore tube within a narrowed portion of the discharge tube vacuum envelope, typically near the "brewster" window. The bore tube is slip-fitted within the vacuum envelope and is free to expand axially when the laser heats up. However, if this fit is sloppy, mechanical vibrations which result can be transmitted into the laser output beam. These mechanical vibrations can also cause stresses to be transmitted to other parts of the tube.

To insure as close a fit as possible, the narrowed envelope cross-section is made to very close tolerances, and then the end of the capillary is ground down to an outside diameter to match that of the envelope. Not only does this entail a very expensive machining operation, a poor fit between the bore tube and the vacuum envelope frequently occurs anyway.

SUMMARY OF THE INVENTION

It is therefore an object of the present invention to provide an improved gaseous laser.

Another object of the invention is to provide a laser which is both rugged and durable.

Another object of the invention is to provide a laser which utilizes inexpensive capillary tubing for the discharge-confining bore tube.

Another object of the invention is to provide a discharge-confining bore tube and means for supporting the same which provides lateral or radial support while permitting axial expansion due to environmental heat changes.

In accordance with the present invention, a bore tube support member is provided having a cavity larger in size than the outside diameter of the bore tube. The bore tube is positioned within the cavity but spaced apart from the cavity walls by means which allow for axial and radial expansion of the bore tube due to thermal expansion, while maintaining lateral or radial alignment of the bore tube relative to the laser optical resonator.

In a preferred embodiment, the bore tube is positioned and supported with a circular cavity by means of a cylindrically shaped member or band which fits between the cavity walls and the bore tube. The band includes a plurality of protuberances or dimples for spacing the bore tube from the aperture walls and for absorbing the small amounts of radial expansion of the bore tube to due thermal expansions.

Desirably, the dimples extend around the band, alternately, protruding inwardly and outwardly. However, in some cases, it may be sufficient to provide only outwardly extending dimples.

BRIEF DESCRIPTION OF THE DRAWINGS

FIG. 1 is a longitudinal cross-sectional view of an improved gaseous laser tube in accordance with the invention.

FIG. 2 is an enlarged view of a glass-to-metal seal of the laser tube of FIG. 1.

FIG. 3 is a cross-sectional view of the discharge-confining bore tube of FIG. 1 taken in a direction indicated by the arrows in FIG. 1.

FIG. 6 is an alternative anode arrangement for the laser tube of FIG. 1.

DESCRIPTION OF THE PREFERRED EMBODIMENT

Figure 5B:
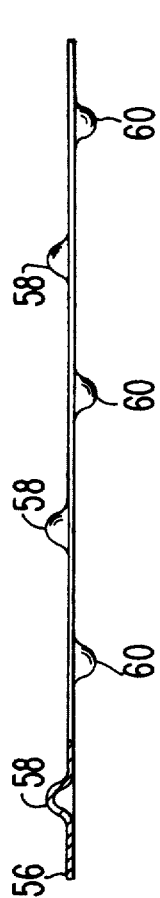
FIGS. 5A and 5B are, respectively, a side view and top view of the discharge-confining bore tube retainer of FIG. 1.

A gaseous laser tube 10 in accordance with the present invention is illustrated in FIG. 1. A gas or a mixture of gases is enclosed within the laser tube 10. The gaseous medium is excited within a discharge passage 11 of a discharge-confining bore tube 12 in a manner well known to those skilled in the laser art. The discharge-confining bore tube 12 is made from a suitable non-electrical conducting material such as pyrex or quartz.

Located near one end of the bore tube 12 is an anode 14 situated in an anode well 16 forming a part of the bore tube 12. Although in the embodiment described only one such anode is shown, additional anodes can be utilized at other locations along the bore tube 12.

An elongated cylindrical cathode 18 is co-axially aligned with and surrounds a substantial length of the bore tube 12. Thus, an electrical discharge path exists beginning at the anode 14 and extending through and along the bore tube passage 11, through an exit port 20 in the bore tube 12, past the outer periphery of an umbrella member 22, and finally to the cathode 18. The purpose of the umbrella member 22 is to prevent the electrical discharge current from impinging upon only a single area of the cathode near one end thereof.

A pair of optical resonator mirrors 24 and 26 are axially aligned with the bore tube 12. The mirrors 24 and 26 form a part of the laser tube 10. That is, mirrors 24 and 26 are in direct communication with the gaseous medium within laser tube 10. Consequently, laser tube 10 itself is a plasma discharge tube, and mirrors 24 and 26 form a part of the envelope thereof.

Mirror 26 is mounted directly to one end of the bore tube 12. Prior to mounting, the end of bore 12 is ground flat and normal to its longitudinal axis. The mirror 26 is mounted to the end of the bore tube 12 by an organic sealant 28, such as epoxy. In one actual embodiment, an epoxy having the tradename "glasshesive" manufactured by Adhesive Engineering Co. and designated their type No. 2060 is utilized.

Cold cathode 18 forms a part of the plasma tube envelope confining the gaseous laser medium within the laser 10 and, as will be explained in greater detail subsequently, additionally performs the function of a support for the optical resonator of laser tube 10.

Cathode 18 is made of a suitable cathode material such as aluminum. Aluminum is particularly desirable since it is both sturdy and durable, and light weight. A generally cylindrical cup or cover 30 extends from one end 32 of the cathode 18 to the bore tube 12 where it is joined at 32. Cover 30 also forms part of the plasma tube envelope. In the embodiment described, cover 30 is fabricated as an integral part of the bore tube 12.

To insure that the gaseous medium is contained within the laser 10, the cover 30 must be suitably secured and sealed with the periphery of cathode 18. Details of this seal are illustrated in FIG. 2. The junction between the glass cover 30 and the aluminum cathode 18 is sealed by a suitable organic sealant 34 such as the epoxy tradenamed "Scotch Weld" manufactured by the 3M Co. and designated their type No. 2214 (Hi-Temp). This seal 34 extends circumferentially around the entire junction between these two parts. This type of epoxy is a high temperature, low vapor pressure cement. Since the strength of the glass forming the cup 30 increases when compressive forces are applied, the glass is put into compression when the cement seal 34 is made. This is accomplished by curing the cement 34 at a higher temperature than is experienced normally during the actual operation of laser 10. This insures a structurally strong, reliable and vacuum-tight seal.

To form an additional part of the discharge tube envelope and to support mirror 24, a base member or cap 36 is provided. Cap 36 has a central aperture 38 which is axially aligned with the discharge path 11 of the bore tube 12. The peripheral or flange portion 40 of the cap 36 is secured to form a vacuum-tight seal with the cathode 18. In the embodiment illustrated, the cap 36 is also aluminum and is welded to the aluminum cathode 18 by conventional means.

In order for the laser to operate properly, optical resonator mirrors 24 and 26 must be parallel with respect to one another. To allow for slight errors in machining and fabrication, mirror 24 is made adjustable. A mirror support plate or disc 42 forms a part of the cap 36. It is spaced-apart and generally parallel with the flange portion 40 of cap 36. The mirror 24 is mounted to the plate 42 by an organic sealant such as the epoxy glasshesive referred to above. The mirror 24 covers the central aperture 38 and completes the plasma tube envelope.

Figure 4:
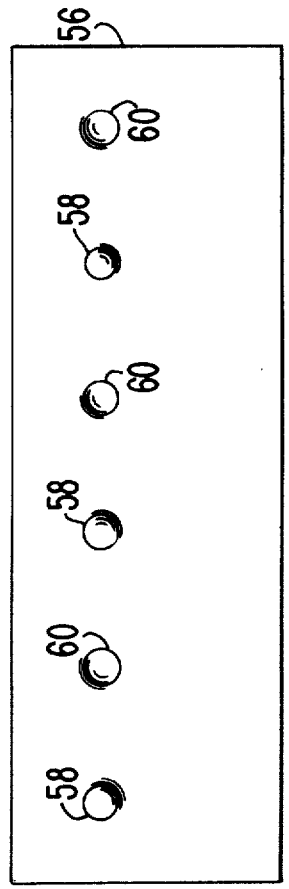
FIG. 4 is an end view of the laser tube of FIG. 1.

Referring additionally to FIG. 4, four adjusting screws 44 extend through peripheral bores 46 provided in disc 42 and into engagement with the base member cap 36. If the laser needs further adjustment to obtain the maximum power, mirror 24 can be easily adjusted by means of the four screws 44. With this arrangement, flexing of the aluminum end member 36 and not the entire bore tube 12 is required to adjust the internal resonator mirror 24 relative to mirror 26.

Thus, it can be seen that not only does the cathode 18 along with the cathode cap 36 form a part of the laser envelope, but cathode 18 also serves to support the mirror 24. Not only does this eliminate the requirement of having to have a separate glass plasma tube envelope, it also provides a more stable support for the optical resonator of laser 10 than in previous designs.

In the present embodiment, the optical resonator is a hemispherical cavity resonator. Mirror 26 comprises a flat reflector which is substantially totally light reflecting. Mirror 24 is a spherical mirror having a 30 cm. radius of curvature. However, it should be understood that the position of these mirrors are interchangeable, i.e., the flat reflector 26 could be switched with the spherical mirror 24.

In order for the laser to oscillate reliably in the lowest transverse order mode, the limiting aperture of the discharge must be precisely controlled within the optical resonator. Thus, the inside diameter of the bore 12 can be used as the mode limiting aperture. However, it has been found that the central aperture 38 of the cathode cap 36 can be utilized to define the mode-limiting aperture. This has the advantage of enabling the bore tube 12 to be made of standard capillary tubing to confine the gas discharge, rather than requiring that the bore tube 12 be manufactured to close inside diameter tolerances to define the limiting aperture.

An alternative anode arrangement is shown in FIG. 6. Anode 14 located in the well 16 of FIG. 1 is replaced by a cylindrical anode 48 having a central aperture 49. Anode 48 is axially aligned with and bonded onto the bore tube 12 at 52 and 54 by suitable bonding means such as an organic sealant, e.g., epoxy. Here again, the diameter of the central aperture 50 can be utilized to determine the transverse mode of the laser 10. Thus, this arrangement is an alternative to the use of the aperture 38 of the cathode cap 36 to define the limiting aperture.

The light reflected between mirrors 24 and 26 defines a generally truncated cone of light, with the largest diameter being near the spherical mirror and the smallest diameter at the flat mirror. Thus, as a practical matter it is best to situate the spherical mirror near the anode, cathode, or that part of the bore tube 12 which defines the limiting aperture.

Cathode cap 36, in combination with cathode 18, being made of aluminum, has a different thermal coefficient of expansion than the bore tube 12, made of glass. Consequently, provision must be made to allow relative movement between these two parts. End 50 of bore tube 12 fits into a female receiving cavity 52 in the cathode cap 36. The end 50 is free to move axially relative to the cathode cap 36.

Figure 5A:
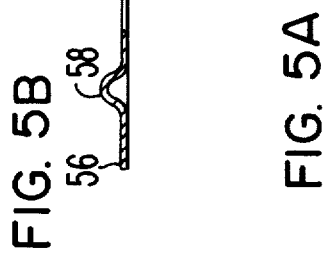

To maintain the bore 12 in proper axial alignment with the central aperture 38, a retaining member 54 is provided. Additional reference is made to FIGS. 3, 5A and 5B. Retainer 54 is constructed from a flat stainless steel rectangular piece 56. Located longitudinally along the rectangular piece 56 are a series of protuberances. Alternate protuberances 58 extend in one direction from the plate 56 and the remaining protuberances 60 extend in the opposite direction. The retainer 54 is made into a cylindrical shape by curving plate 56 until opposite ends of the plate meet to form a seam 62. The completed retainer 54 is then placed around the end 50 of the bore 12 prior to the insertion of the cathode cap 36.

An annular getter is mounted to a stainless steel annular member 90 by a support member 92. The strip 90 is spring fitted into cathode 18. During the fabrication of the laser, the getter 88 is heated so as to deposit a thin film around the inside surface of cover 30. This thin film absorbs unwanted gases which result from impurities within the gas mixture and from cathode sputtering. The getter may be made from a suitable material such as barium.

As explained above, both of the mirrors 24 and 26 are joined to the gas containing envelope by means of an organic sealant. Similarly, the cathode 18 is joined to the glass cup 30 by means of an organic seal 34. Water permeation through these organic sealants poses a problem since water vapor with the tube 10 is detrimental to the operation of the laser.

Figure 7:
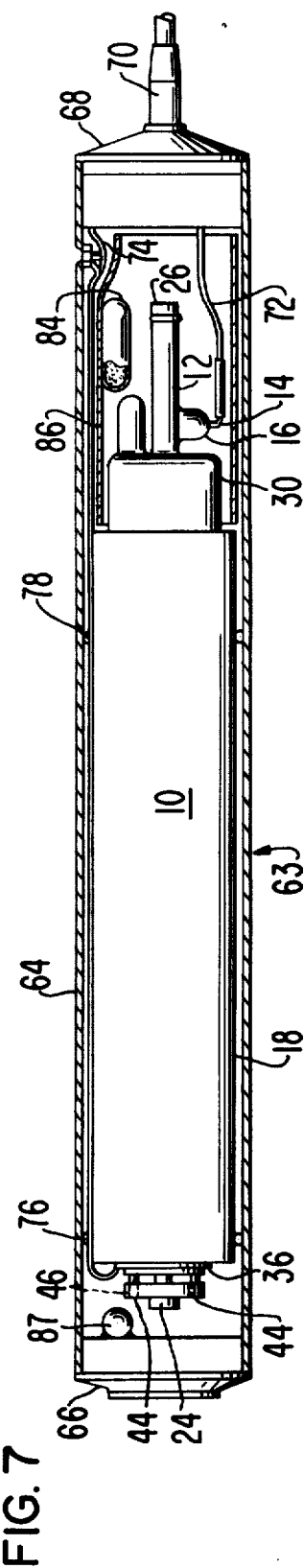
FIG. 7 is a cross-sectional view of the laser of FIG. 1 and a laser tube enclosure having means for reducing water permeation into the laser tube.

A technique for overcoming this problem is shown in FIG. 7. Laser tube 10 is enclosed within an exterior housing assembly 63 which includes a tubular housing member 64. Tubular housing member 64 may be made of any suitable material which is both rugged, light-weight and airtight, such as aluminum. A front end cap 66 and a back end cap 68 complete the housing assembly 63. Although the end caps 66 and 68 can be made of the same material as the housing tube 64, it is not necessary to weld these pieces to the tube 64. In fact, they can be mounted to the tube 64 by an organic sealant such as the epoxy glasshesive referred to above. End cap 68 is provided with a cable 70 through which the anode lead 72 and a cathode lead 74 pass.

The laser tube 10 is supported within the housing tube 64 by a pair of O-rings 76 and 78. These O-rings serve several functions including the absorption of mechanical vibrations which would otherwise be transmitted from the housing assembly 63 to the tube 10.

Capsule 84 contains a water vapor-absorbing desiccant. The capsule is suitably mounted to a mylar sleeve 86. The mylar sleeve 86 additionally serves to insulate the anode 14 from the aluminum housing tube 84. Similarly, a second capsule 87 containing a water vapor-absorbing desiccant is mounted at the opposite end of the housing assembly 63. A suitable desiccant for both of the capsules is silica-gel.

The housing assembly 83 prevents most water vapor amounts from entering within the regions surrounding the laser tube 10. What water vapor does penetrate the seals between the end caps 66 and 68 and the housing tube 64 is absorbed by the desiccant. The desiccant has been found to keep the water vapor pressure to $28 \times 10^{-3}$ torr or less near the tube 10. This partial pressure of water vapor is a tolerable value for the various organic seals of the laser tube 10 to be exposed to.

In one actual embodiment of the laser tube 10, the length of the bore tube 12 is 256 mm., the outside diameter of the bore tube 12 is 7 mm. and, with the bore tube 12 defining the limiting aperture for purposes of mode determination, its inside diameter is 0.061 in. In that laser the gaseous medium is a combination of helium and neon at pressures of 3.1 torr and 0.4 torr respectively. The output wavelength of the laser is at 6,328 A (red).

If a polarized beam is desired from laser 10, brewster angle windows can easily be incorporated into the present design. For example, mirror 24 can be replaced by an elongated aluminum tube which is welded onto the cathode cap 36. A glass plate at Brewster's angle is mounted within the tube and the mirror 24 is secured to the end of the aluminum tube extension.

In the embodiment illustrated, only a single reflector is supported by the cathode 18. However, where greater stability is desired or required, both resonator reflectors can be supported by the cathode 18.

Since the cathode 18 is not insulated by a glass envelope as in previous laser designs, from the standpoint of safety, it is desirable to have the cathode at ground potential, and the anode at a positive potential.

Although the laser tube described herein utilizes only a single anode, additional anodes can be provided along the bore tube if desired.

What is claimed is:

1. A gaseous laser comprising:
   a. a discharge-confining bore tube;
   b. optical resonator axially aligned with at least a part of said bore tube;
   c. means for providing an electrical discharge through said discharge-confining bore tube including an anode and an elongated cylindrical cathode surrounding at least a part of said bore tube and a cap means for closing an end of said cathode;
   d. said cap means having formed therein a a bore tube receiving aperture, said aperture being larger in size than the outside diameter of said bore tube; and
   e. means for retaining said bore tube within said aperture and spaced apart from said aperture walls, said retaining means including means for allowing axial expansion of said bore tube while maintaining lateral alignment thereof relative to said support member and said optical resonator.

2. A gaseous laser as in claim 1 wherein said retaining means includes means for permitting radial expansion of said bore tube.

3. A gaseous laser as in claim 2 wherein said bore tube receiving aperture has a circular cross section.

4. A gaseous laser as in claim 3 wherein said retaining means comprises a cylindrically-shaped member concentrically arranged between said bore tube and the walls of said receiving aperture, and having a plurality of protuberances extending radially outwards along the surface of said cylindrically-shaped member, said protuberances engaging the aperture wall.

5. A gaseous laser as in claim 4 wherein said cylindrically-shaped member has a plurality of protuberances extending radially inwards along the surface thereof, said protuberances engaging the outer surface of the bore tube.

6. A gaseous laser as in claim 5 wherein said outwardly and inwardly extending protuberances are alternately positioned around said cylindrically-shaped member.

* * * * *